United States Patent [19]
Worthington

[11] 4,128,124
[45] Dec. 5, 1978

[54] MULTI-MODE SOLAR HEATING AND COOLING SYSTEM

[76] Inventor: Mark N. Worthington, 10227 White Mtn. Rd., Sun City, Ariz. 85351

[21] Appl. No.: 813,440

[22] Filed: Jul. 7, 1977

Related U.S. Application Data

[63] Continuation-in-part of Ser. No. 658,475, Feb. 17, 1976, Pat. No. 4,068,652, and Ser. No. 658,476, Feb. 17, 1976, Pat. No. 4,049,046, each is a continuation-in-part of Ser. No. 519,521, Oct. 31, 1976, Pat. No. 3,957,109.

[51] Int. Cl.² ............................ F24J 3/02; F25B 29/00
[52] U.S. Cl. ................................ 165/48 S; 165/104 S; 237/1 A; 126/270
[58] Field of Search .............. 165/48 S, 104; 126/270, 126/271; 62/304; 237/1 A

[56] References Cited

U.S. PATENT DOCUMENTS 4,064,867  12/1977  Schlesinger ........................ 237/1 A

*Primary Examiner*—William L. Freeh
*Attorney, Agent, or Firm*—Herbert E. Haynes, Jr.

[57] ABSTRACT

A multi-mode solar heating and cooling system including a solar collector/heat exchanger unit for heating air and/or liquid has an air compartment through which air from a point of use is circulated, and has a liquid compartment through which liquid is circulated from a liquid storage tank. An evaporator unit for chilling air and liquid by evaporation has an air moving device for selectively supplying chilled air directly to the point of use of diverting that air, and is connected to the liquid storage tank for chilling of the liquid therein. Thus, the liquid from the tank may be selectively circulated through the evaporator unit or through the solar collector/heat exchanger unit for appropriate heating or chilling of the liquid which may be simultaneously or subsequently employed for treating the air circulating through the solar collector/heat exchanger unit. Auxiliary heating and cooling coils are provided within the storage tank for standby heating or chilling of the liquid by utilization of suitable conventional heating and cooling devices, and the system is provided with retractable panels for covering the solar collector/heat exchanger unit during different operating modes. The system may also include a solar reflector device for enhancing the solar collecting efficiency of the system and may further include apparatus for selectively supplying untreated fresh air to the premises.

12 Claims, 8 Drawing Figures

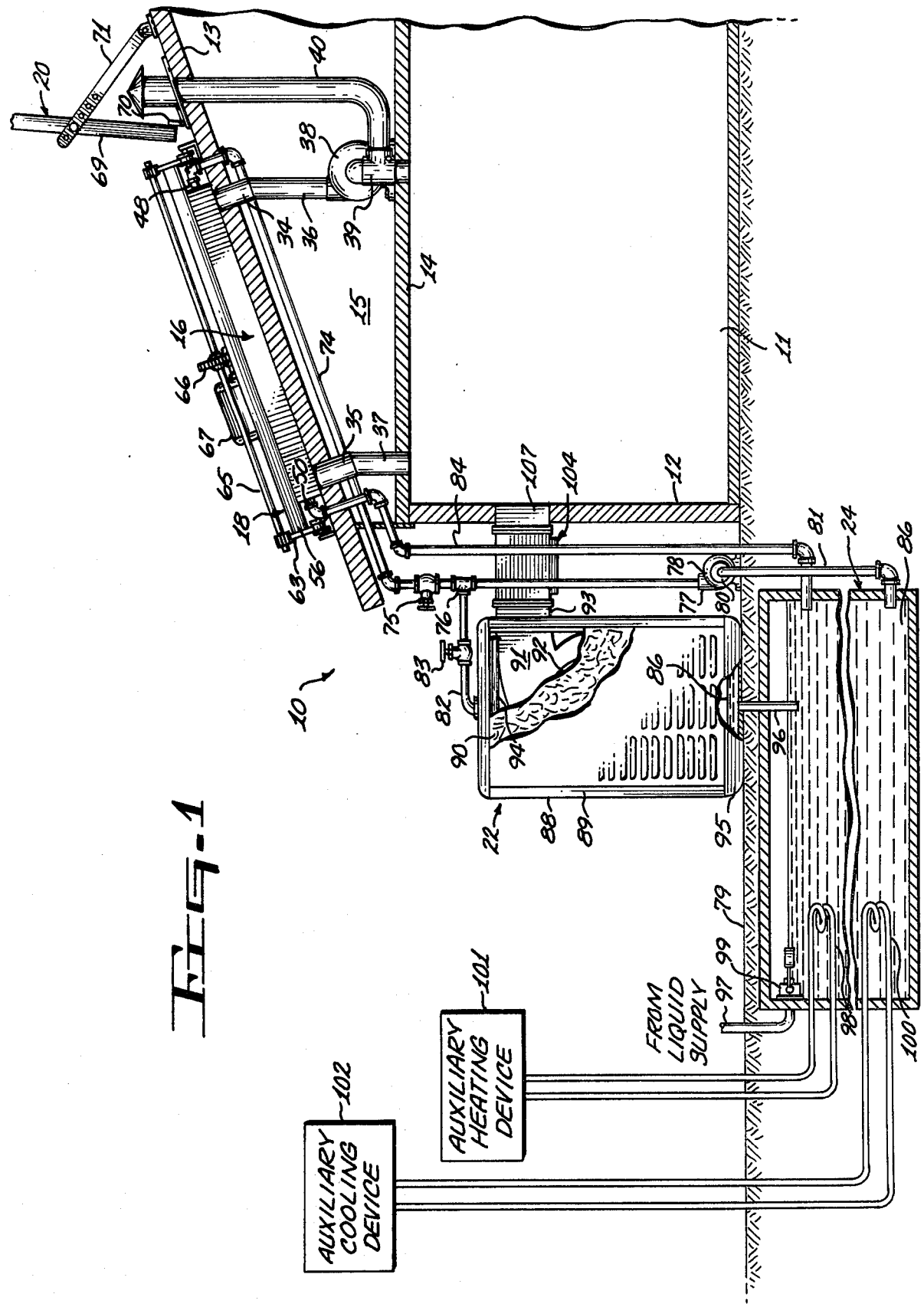

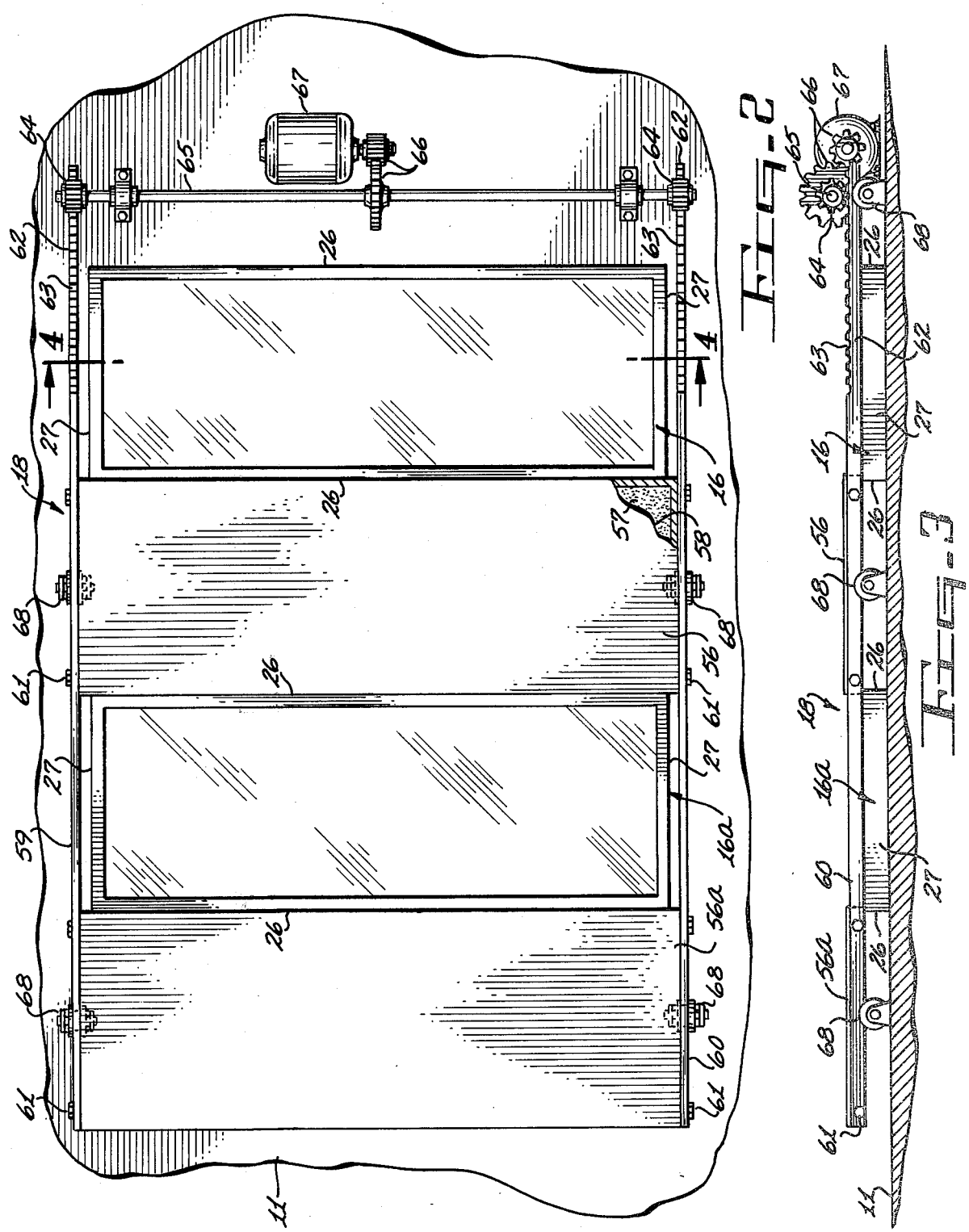

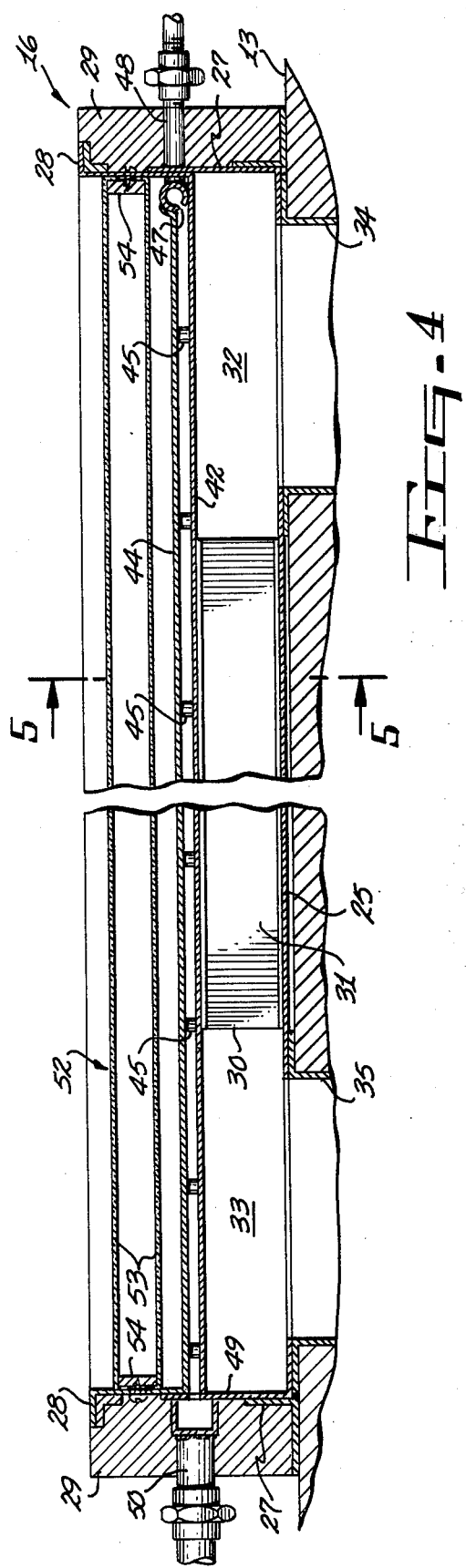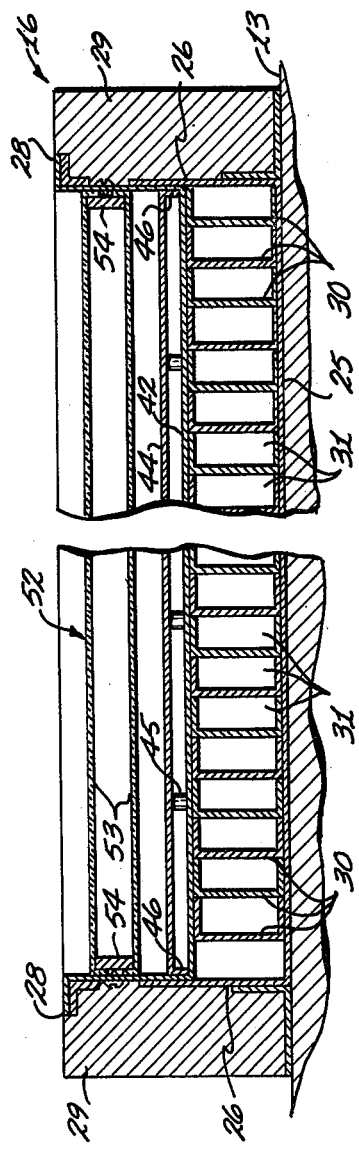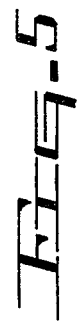

MULTI-MODE SOLAR HEATING AND COOLING SYSTEM

CROSS REFERENCE TO RELATED APPLICATIONS

This application is a continuation-in-part of copending U.S. patent application, Ser. Nos. 658,475 now U.S. Pat. No. 4,068,652 and 658,476 now U.S. Pat. No. 4,049,046, both filed on Feb. 17, 1976, by the same inventor, with both of those applications being continuations-in part of Ser. No. 519,521, filed Oct. 31, 1974, now U.S. Pat. No. 3,957,109, issued on May 18, 1976, to the same inventor.

BACKGROUND OF THE INVENTION

The present invention relates to solar heating and cooling systems, and more particularly to a solar heating and cooling system having multiple operating modes.

Due to the energy crises presently existing and the increase in the price of fuel, the attention of engineers, inventors, and other has been directed to the utilization of alternate sources of energy such as solar heating and cooling systems. Solar collectors and heat exchanger units are the very heart of any solar heating and cooling system. If such an apparatus is to be mounted on the roof of a building, and particularly on a home, there are space limitations which must be considered. Thus, if the installation is too bulky and occupies an excessive amount of space on the roof, it will not be acceptable to the public. If the units are especially massive or heavy, they are not susceptible of installation on presently existing buildings without making major structural changes to the buildings. The apparatus which is installed on a roof should be of compact thickness and occupy as small an area as possible to avoid an unsightly appearance.

Further, solar heating and cooling systems should be capable of various modes of operation to take advantage of various heating and cooling energies when those energies are readily available, and should further be capable of supplying different types of conditioned air when appropriate.

Solar heating and cooling systems now available to the public are very expensive from both construction and installation standpoints, with the total costs being excessively high so as to discourage their acceptance. The present invention is founded on the belief that the system of this invention may be manufactured and installed at a price which will be acceptable to many of the people who cannot now afford the existing solar heating and cooling systems. In addition, the operational costs will be a fraction of that of the conventional heating and cooling systems. One of the outstanding features of the instant system is that it may be installed in most existing building structures with minimal alterations thereof and without disrupting the present heating and/or cooling systems. The system of the present invention does not require that a new building or home be constructed to accommodate it, thus making this system readily available to the public.

Conventional heating and cooling systems, and many of the known solar heating and cooling systems are notably lacking in means for the storage of thermal energy and thus are forced to operate on what may be called a demand basis, and such techniques result in wasted and inefficient utilization thereof.

The problems resulting from the demand basis technique may be placed in three major problem areas with the first being demand timing, the second being the intermittent delivery, and the third problem being the fluctuating amounts of energy that must be supplied to satisfy the demand.

To explain the term 'demand basis', consider a home which is either too hot or too cold, that fact is sensed by a thermostat which actuates the appropriate equipment and when that demand has been satisfied, the equipment is shut down.

With regard to the first problem area defined above as 'demand timing', the demand for heating and/or cooling invariably occurs at times when those tasks are most inefficiently accomplished. For example, it is well known that a heat pump is an efficient mechanism, however, the demand basis under which a heat pump is forced to operate substantially reduces the efficiency of that equipment. During a heating cycle, the heat pump will extract heat from the atmosphere and direct it to the zone being heated. The demand for heat in the zone is the greatest when the temperature is low and the atmosphere contains a relatively small amount of readily available heat. Due to this lack of readily available heat, during the peak demand time, the heat pump must work hard to accomplish the task being asked of it. The same basic inefficiency results during a cooling cycle of the heat pump due to the heat extracted from the zone being dissipated into the atmosphere that already contains a relatively large quantity of heat. Thus, to accomplish satisfactory operation under these conditions, the equipment must be relatively large to compensate for inefficient operation resulting from demand timing and it is readily apparent that operating the equipment inefficiently results in the consumption of power at a rate which is excessive for the amount of work being accomplished.

In regard to the second problem defined above as 'intermittent delivery', consider a zone being heated with the thermostat being set at 70°. Due to intermittent delivery, the temperature in the zone will vary in a range of from about 67° to 74°. When the temperature in the zone falls to about 67°, the heating equipment is started and will continue to operate until the zone temperature reaches about 74° at which time the equipment is shut off. The temperature will then drop until the 67° level is reached again and the heating cycle is repeated again. This temperature drop is non-linear due to the varying heat loss at the different temperatures, with the heat loss being considerably greater at 74° than at the lower temperatures. It is well known that the heat loss through walls, ceilings, windows, and the like, is determined by the temperature differential on opposite sides thereof. Thus, the temperature drop from 74° to 70° will be relatively rapid and it will slow down in the drop from 70° to 67°. The zone will therefore fluctuate in temperature and will be below the desired 70° level the greatest percentage of the time. It will be obvious that the exact opposite temperature fluctuations will occur when a zone is being cooled. Such temperature fluctuations in conjunction with the duration of the undesirable temperatures results in discomfort often resulting in upward or downward adjustments of the thermostat. Such discomfort is but one drawback of an intermittent delivery system with other drawbacks being the relatively high power consumption and the heat loss or gain of such a system when compared with one of constant delivery. The power consumed in repeatedly starting and stopping equipment is well known to be greater than the power consumed in continuous operation thereof. Also, repeated actuation of such equipment to raise or lower the temperature utilizes more energy than constantly deliverying constant properly conditioned air to maintain the desired temperature. By maintaining a constant confortable temperature, the increased heat loss or gain which occurs at fluctuating temperatures is avoided.

The third problem area relating to the fluctuating amounts of energy supplied to satisfy the demand basis technique will be easily understood upon consideration of the hereinbefore described examples relating to heating and cooling. It has been established that the demand for heating and cooling is the greatest when it is most difficult to accomplish those tasks. Those demands, plus other energy consuming habits of the consumers, cause tremendous fluctuation of the energy consumption to occur over a given period of time. For example, in hot weather, electric power generating facilities will be operating at or near capacity from approximately 3:00 P.M. to 8:00 P.M. and will be operating considerably below capacity at other times of the day. Such inconsistent energy demands cause problems for the utility companies and such problems result in higher rates for the consumer as well as possible energy curtailments.

Briefly, the fluctuating energy consumption as described above results in problems for the utility companies in that their ability to meet the demand during peak demand periods is constantly reduced as the demand for energy increases. Until recently, this presented no problems in that when the demand went up the utilities simply acquired more fuel for the production of energy or built more power generating facilities. Such solutions are no longer a simple matter due to environmental considerations, availability of fuel to distribute to consumers or to operate generating equipment, the greatly increased cost of building facilities, and the like.

OBJECTS OF THE INVENTION

With the foregoing conditions and problems in mind, the present invention has in view the following objects:

1. To provide an efficient solar heating and cooling system in which the main sources of energy are solar heating and evaporative cooling.

2. To provide a system of the above noted type in which a liquid may be heated or chilled, for storage, recycling and for treating air in a premises.

3. To provide, in a solar heating and cooling system of the character aforesaid, evaporator means which is employed for the direct cooling of air and for chilling a liquid which is storable for subsequent use and/or simultaneously usable for indirect cooling of air.

4. To provide, in a solar heating and cooling system of the type noted, a solar collector for heating air and/or a liquid with that liquid being storable for subsequent use in heating of air.

5. To provide, in a solar heating and cooling system of the type aforesaid, means for utilizing auxiliary heating devices for standby heating during periods of insufficient solar activity.

6. To provide, in a solar heating and cooling system of the character aforesaid, means for utilizing auxiliary cooling devices for standby cooling when evaporative cooling is inefficient.

7. To provide, in a solar heating and cooling system of the character aforesaid, means for delivering fresh untreated air.

8. To provide, in a solar heating and cooling system of the character aforesaid, an arrangement of elements which allows the liquid in the system to drain into an underground tank by gravity within a short period of time to prevent freezing in cold weather.

9. To provide, in a solar heating and cooling system of the type noted, a solar collector/heat exchanger for heating, by radiation and convection, the air circulating therethrough to and from a premises.

10. To provide, in a solar heating and cooling system of the above described character, a solar collector/heat exchanger for heating liquids in the system for subsequent use in the heat exchanger for indirectly heating air circulatable therethrough to and from a premises.

11. To provide, in a solar heating and cooling system of the above described type, a solar collector/heat exchanger which when covered and has chilled liquid circulating therethrough, functions as a heat exchanger for indirectly cooling air circulatable therethrough to and from a premises.

12. To provide, in a solar heating and cooling system of the hereinbefore noted type, a solar collector/heat exchanger unit, a retractable cover therefor, a solar radiation reflector, an evaporator unit, and an underground liquid storage tank, all of which cooperate to function efficiently for constant delivery of air to a premises by means of plural operating modes.

Various other and more detailed objects and advantages of the invention, such as arise in connection with carrying out the above ides in a practical embodiment will in part become apparent, and in part hereinafter, be stated as the description of this invention proceeds.

SUMMARY OF THE INVENTION

The foregoing and other objects of the invention are accomplished by providing a multi-mode solar heating and cooling system, the characteristic and essential elements of which include: a solar collector/heat exchanger unit having retractable cover panels, a solar radiation reflector, a liquid storage tank, and an evaporator unit which are interconnected by and operate in conjunction with suitable plumbing, ducts, liquid and air moving devices and other mechanisms as will hereinafter be described in detail.

The solar collector/heat exchanger is enclosed within a suitably insulated frame or enclosure and includes an air compartment formed of a plurality of longitudinally extending channels having a manifold at each of the opposite ends thereof which are in communication with all of those channels. A liquid compartment is provided immediately above the air compartment and in contiguous engagement therewith for transferring thermal energy therebetween. The liquid compartment includes spaced flat metallic sheets between which sheeted liquid flows from a perforated feed pipe to an oppositely positioned liquid collecting trough. The flat metallic sheets are suitably treated so as to act as a solar radiation absorbing panel, and the entire liquid compartment is spacedly disposed below a solar window heat trap formed by a spaced pair of transparent sheets.

The solar collector/heat exchanger unit is provided with retractable cover panels which allow the unit to be exposed during periods of solar radiation activity and to be covered during inactive periods to prevent heat loss by re-radiation. In addition, the cover panels will block solar radiation impingement upon the solar collector/- heat exchanger when chilled liquid is circulating therethrough for indirect cooling of air.

It is preferred, that the solar collecting function of the solar collector/heat exchanger unit be enhanced by a reflector device which increases the amount of solar radiation impinging thereon.

Heating of the liquid within the solar heating and cooling system of the present invention is accomplished by the liquid, preferably water, being directed from the storage tank through an inlet pipeline having a pump therein, to the perforated feed pipe of the liquid compartment of the solar collector/heat exchanger unit. After passage of the water through the spaced metallic sheets, the heated water is collected in the trough and returned to the storage tank by a return pipeline. Chilling of the liquid in the solar heating and cooling system is accomplished by directing water from the storage tank to an evaporator unit in the form of a cooling tower, evaporative cooler, or similar device and when the water supplied thereto is chilled by evaporation, it is returned to the storage tank.

Thus, the liquid in the solar heating and cooling system as described above may be heated and chilled in accordance with the desired seasonal requirements, and may be employed in the solar collector/heat exchanger to indirectly condition the air of the premises. Such indirect conditioning of the air is accomplished by supplying the air from a premises to be heated or cooled through the supply duct, having an air moving blower therein, to one of the manifolds of the air compartment of the solar collector/heat exchanger unit. After passage of that supplied air through the plurality of channels, the exiting air is returned to the premises by means of a return duct connected to the other manifold of the air compartment.

In addition to the wear chilling function of the evaporator unit, that unit is provided with means for drawing ambient air therethrough for chilling thereof on its way into the premises, thus providing the system of the present invention with direct evaporative cooling capabilities.

An alternate method of heating the air in a premises may be employed wherein air from the premises is circulated through the uncovered solar collector/heat exchanger unit from which the liquid has been removed. In such a case thermal energy impinging upon the solar collector is transmitted by radiation and conduction to the air circulating through the heat exchanger.

In addition to the above described primary sources of energy for heating and cooling the liquids, the system of the present invention may be provided with auxiliary or backup energy devices for heating and cooling of the liquid therein. Such backup systems operate on a standby basis for heating and cooling purposes during periods of insufficient solar radiation and during periods when the evaporator unit is incapable of effective evaporative cooling. The backup energy system may include a heating coil and cooling coil located within the storage tank, so that conventional devices for heating and cooling of the liquid may be employed when necessary. Such conventional sources may include a heat pump, a refrigeration unit, electric or gas heating unit, or any of several other well known devices.

In addition to the previously described functions of the solar heating and cooling system of the present invention, the system may also be provided with means for circulating fresh ambient air through the premises when the temperature and humidity of that ambient air makes the heating or cooling thereof unnecessary.

For a full and more complete understanding of the solar heating and cooling system of the present invention, reference is made to the following description and accompanying drawings.

BRIEF DESCRIPTION OF THE DRAWINGS

FIG. 1 is a side elevational view of the system of the present invention in schematic form with portions thereof broken away to illustrate the various features thereof.

FIG. 2 in an enlarged plan view of the solar collector/heat exchanger unit and the retractiable cover panels therefor.

FIG. 3 is an end elevational view of the elements shown in FIG. 2.

FIG. 4 is an enlarged fragmentary sectional view taken on the line 4—4 of FIG. 2.

FIG. 5 is a fragmentary sectional view taken on the line 5—5 of FIG. 4.

DESCRIPTION OF THE PREFERRED EMBODIMENTS

Figure 8:
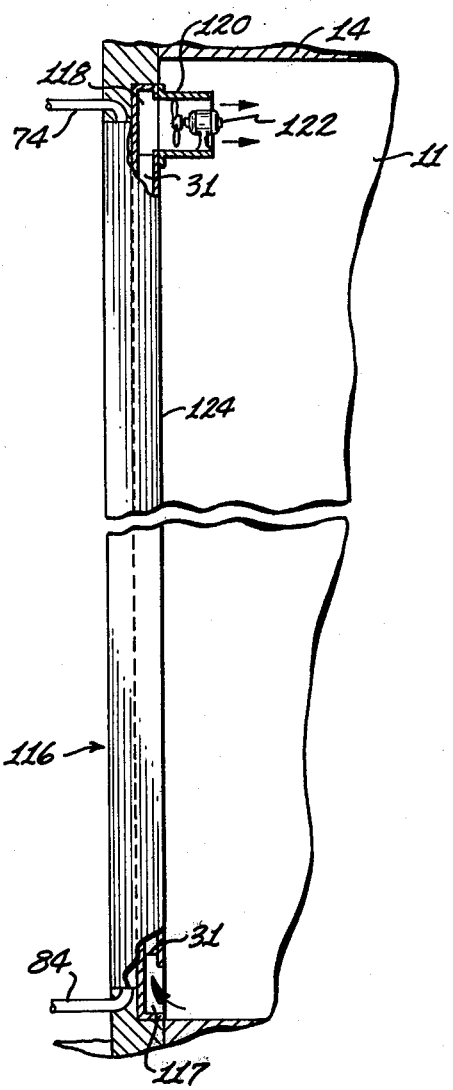
FIG. 8 is a side elevational view of an alternate method for mounting the solar collector/heat exchanger unit.

Referring more particularly to the drawings, FIG. 1 shows the multi-mode solar heating and cooling system of the present invention which is indicated generally by the reference numeral 10. As shown, the system 10 is mounted on and connected to a suitable building 11 having the usual side walls 12 (one shown), inclined roof 13, with a ceiling structure 14 spaced from the roof to provide an attic space 15.

As shown in FIG. 1, and as will hereinafter be described in detail, the main components or elements of the system 10 are a solar collector/heat exchanger unit 16, a retractable cover panel assembly 18, a solar radiation reflector mechanism 20, an evaporator means 22, and a liquid storage tank 24. Those main elements are provided with subsystems and interconnecting components which will be described as this description progresses.

The solar collector/heat exchanger unit 16 is a multi-purpose mechanism and as seen in FIGS. 1, 2, 3, 4, and 5, is preferrably of rectangular box shaped configuration providing an enclosure having a bottom 25, longitudinally extending side walls 26 and end walls 27, with the extending edges of the side and end walls, 26 and 27, respectively, being formed with flanges 28 which define an opening in the box shaped enclosure. The side and end walls 26 and 27 are covered on their outwardly disposed surfaces with suitable insulative material 29.

Positioned within the box shaped enclosure of the unit 16 adjacent the bottom 25 thereof is an air compartment which comprises a plurality of longitudinally extending channel members 30 which are arranged parallel with respect to each other to form a plurality of air passages 31. At one end of the channels adjacent one of the end walls 27, an air inlet manifold 32 is provided which extends transversely with respect to those channels and is in communication with the passages 31. Similarly, a transverse air outlet manifold 33 is provided at the opposite ends of the channels 30 and is in communication with the opposite ends of the air passages 31. As will hereinafter be described in detail, the bottom 25 of the housing is formed with a normally extending inlet duct 34 immediately below and in communication with the air inlet manifold 32 and is formed with a similar outlet duct 35 immediately below and in communication with the outlet manifold 33.

As shown in FIG. 1, when the solar collector/heat exchanger unit 16 is mounted on the roof 13 of the building 11, the inlet duct 34 and outlet duct 35 extend through the roof into the attic 15 and are suitably coupled to air supply duct 36 and an air return duct 37. The air supply duct 36 communicates on its opposite end with the outlet of a suitable blower 38, with the inlet of that blower coupled to an air directing device 39 which, as will be described, allows air to be drawn into the blower 38 either from within the building 11 or from ambient by means of a fresh air duct 40. The air return duct 37 extends downwardly from the outlet duct 35 through the ceiling of the building 11 so as to be in communication with the interior thereof. Thus, it may now be seen that air may be circulated through the air compartment of the solar collector/heat exchanger unit 16 either from and to the interior of the building 11, or from ambient to the interior of the building.

Referring again to FIGS. 4 and 5, the solar collector/heat exchanger unit 16 is seen to include a liquid compartment immediately above and in contiguous engagement with the previously described air compartment. The liquid compartment includes a bottom flat metallic sheet 42 in contiguous engagement with the channels 30 of the air compartment, and an upper flat metallic sheet 44 which is spaced from and parallel with respect to the bottom sheet 42. The spacing and parallelisms of the sheets 42 and 44 is maintained by a plurality of spacers 45 interposed therebetween at various locations. The longitudinal edges of the sheets 42 and 44 are sealed by any suitable means at 46 (FIG. 5) so as to be watertight. The aligned end edges of the metallic sheets 42 and 44 which are adjacent the inlet air manifold 32 are open along the length of those edges and a perforated feed pipe 47 is sealingly affixed so that the perforations thereof communicate with the space between the sheets. The feed pipe 47 is supplied with liquid by means of an inlet pipe 48 suitably affixed thereto as will be hereinafter described. The opposite side edges of the sheets 42 and 44 are also open along their entire length so that the space between the sheets is in communication with a liquid trough 49 and is provided with a drain pipe 50 which extends therefrom exteriorly of the solar collector/heat exchanger unit 16. In operation, liquid is jetted, or sprayed, under pressure from the feed pipe 47 and will form a thin film, or sheet, of liquid which flows by gravity between the metallic sheets 42 and 44 and is collected in the liquid trough 49.

In parallel relationship with respect to the metallic sheets 42 and 44 and disposed so as to be spaced thereabove, a solar window heat trap 52 is provided which serves as a solar window for solar radiation impinging thereon, and due to what is commonly referred to as the 'greenhouse effect', will prevent the escape of most of the radiation. While the solar window heat trap may take any of several well known forms, such as spaced double glazed glass, the preferred construction includes a pair of spaced transparent, or semi-transparent, sheets 53 of pre-stretched suitable plastic material such as that marketed under the trade name 'Tedlar'. The transparent sheets 53 are pre-stretched on a suitable frame 54, such as of wood, and that assembly is suitably demountably affixed in sealed engagement with the interior surfaces of the side and end walls 26 and 27 of the solar collector/heat exchanger unit 16.

It should be noted that at least the upwardly disposed surfaces of the metallic sheets 42 and 44 are suitably treated, such as by blackening thereof, so that those sheets will serve as solar radiation absorbing panels and will thus be heated when solar energy impinges thereon through the solar window heat trap 52.

As hereinbefore mentioned, the solar heating and cooling system further includes a retractable cover panel assembly 18 which is seen best in FIGS. 2 and 3.

Before proceeding with the detailed description of the cover assembly 18, it is deemed appropriate to note that although the description thus far has referred to only one solar collector/heat exchanger unit 16, it will be appreciated that a plurality of such units may be employed as dictated by system requirements, as is well known in the industry. Thus, for completeness of this disclosure, FIGS. 2 and 3 illustrate a pair of the solar collector/heat exchanger units which are designated in their entirety by the numerals 16 and 16a.

The retractable cover panel assembly 18 is therefore shown to be configured for operation with the two solar collector/heat exchanger units 16 and 16a, and it will be understood that the assembly 18 may be configured to handle a single or multiplicity of such units.

In the case illustrated, the panel assembly 18 includes a pair of cover panels 56 and 56a which are each sized to have approximately the same length and width dimensions as the solar collector/heat exchanger units 16 and 16a, and are laterally spaced apart a distance approximately equal to the width dimension of the units 16 and 16a. The panels 56 and 56a are preferably fabricated of insulative material 57 such as polyurethane which is encased in a suitable skin 58 such as of metal. The aligned end walls of the panels 56 and 56a are interconnected by a pair of elongated bars 59 and 60, affixed such as by bolts 61, to maintain the spaced disposition of the panels so that they will move in unison. The bars 59 and 60 are each provided with an extending end 62 having suitable teeth 63 formed thereon so that the ends serve as racks which are engaged by pinion gears 64. The pinion gears 64 are mounted for rotation on the opposite ends of a drive shaft 65 which is driven through reduction gears 66 by a reversible drive motor 67. The bars 59 and 60 are supported on appropriate roller wheels 68 affixed to the roof 13 so that upon actuation of the motor 67, the panels will move from the open position shown to a position which completely covers the solar collector/heat exchanger units 16 and 16a.

The solar radiation reflector mechanism 20, as shown in FIG. 1, includes a reflector panel 69 which is mounted on the roof 13 such as by a hinge 70 and is adjustably supported in various angular positions with respect to the roof by side braces 71 (one shown). The reflector 20 is employed to enhance the operation of the solar collector/heat exchanger unit 16 by directing reflected solar rays thereon in addition to the directly impinging solar rays. Although the reflector mechanism is disclosed as being manually adjustable, it will be obvious that such adjustment could be made automatically by equipping the mechanism with any of several well known devices such as a light sensing diode (not shown) which activates suitable positioning equipment (not shown).

The inlet pipe 48 of the solar collector/heat exchanger unit 16 is coupled as shown in FIG. 1, to a liquid supply line 74 which extends downwardly from the unit 16 through a shutoff valve 75, through a T-fitting 76 to the outlet 77 of pump 78 mounted such as on the ground 79 adjacent the building 11. The inlet 80 of the pump 78 is connected by a pipeline 81 to the liquid storage tank 24. The T-fitting 76 provided in the liquid supply line 74, has a pipe 82 connected thereto which has a shutoff valve 83 therein and which is connected on its opposite end to the evaporator means 22.

The drain pipe 50 of the solar collector/heat exchanger unit 16 is coupled by a liquid return line 84 to the underground liquid storage tank 24.

Thus, it will be seen that the liquid 86, preferrably water, within the storage tank 24 may be directed by pump 78 to the inlet side of the solar collector/heat exchanger unit 16, and after passage therethrough, the liquid will be returned to the tank 24. Further, the liquid 86 may be directed through pipe 82 and valve 83 to the evaporator means 22.

The evaporator means 22 may be any well known device which utilizes the principle of cooling by evaporation. Such known devices may be in the form of a cooling tower (not shown) or an evaporative cooler 88. The evaporative cooler 88, shown for completeness of this disclosure, is of the type sometimes referred to in the industry as a 'side draft' cooler. Briefly, the cooler 88 includes a suitable housing 89 having wettable cooler pads 90 (one shown) mounted in the sides thereof. An air moving centrifugal blower 91 is mounted within the housing 89, and the blower has an axial inlet 92 and a centrifugal outlet 93. The wettable cooler pads 90 receive water from a distribution manifold 94 mounted above the pads adjacent the top of the housing 89, and the water, after passing through the pads, is collected, in a sump 95 at the bottom of the housing. As shown, the evaporative cooler 88 is mounted over the liquid storage tank 24 so that water 86 within the sump 95 will drain by gravity through a pipeline 96 into the liquid storage tank 24.

The liquid storage tank 24 may be configured in any suitable shape with the size thereof being determined by the storage capacity requirements of the particular installation. The tank may be fabricated of any suitable material, and is preferrably below the ground and must be well insulated. Although the tank 24 is shown as being burried in the ground 79, it could just as well be located in a basement (not shown), or otherwise, as long as it is below the bottom of the evaporator means 22. The storage tank 24 is equipped with a suitable make-up water system such as a supply line 97 leading from a suitable source of water (not shown) with the line connected to a float operated shutoff valve 99.

The storage tank 24 is provided with a pair of auxiliary heat exchangers in the form of a heating coil 98 and a cooling coil 100. The heating coil 98 is submerged in the liquid 86 and may be connected to any of several well known heating devices which are indicated by the block 101. Such devices may include any device which will heat water by utilizing conventional energy forms such as electric, natural gas, steam and the like. The cooling coil 100 is also submerged in the liquid 86 of the tank 24 and may be connected to any of several well known cooling devices which are indicated by the block 102. Such devices may include a refrigeration unit (not shown) which is operated by conventional energy forms such as electricity or natural gas.

The heat exchanger coils 98 and 100 and their respective heating and cooling devices 101 and 102 are employed as standby or booster mechanisms. The heating coil 98 and auxiliary heating device 101 will operate to heat the liquid 86 during periods of prolonged solar inactivity and/or to boost the liquid temperature when the amount of solar radiation is insufficient to heat the liquid to the necessary temperatures. Likewise, the cooling coil 100 and its auxiliary cooling device will operate to chill or assist in chilling the liquid 86 when the atmospheric conditions are such that the evaporator means will not function efficiently such as in periods of relatively high humidity.

It will be appreciated that the above described auxiliary heating and cooling devices would not be necessary when the solar heating and cooling system 10 of the present invention is installed in a building which has existing conventional heating and cooling equipment. However, when installed in a new building, the above described auxiliary heating and cooling devices may be employed to provide a completely self-sufficient solar heating and cooling system and the auxiliary equipment can be of relatively small size as compared to a system which utilizes such equipment for all the heating and cooling functions. This can be easily understood upon consideration of the hereinbefore described problems associated with equipment operated on a demand basis as compared to equipment which may be operated when it is economically feasible and convenient to do so, such as during non-peak load periods.

OPERATION

The solar heating and cooling system 10 of the present invention is capable of operating in various modes which will now be described in detail.

During the heating season, with the retractable cover panel assembly 18 in the open position and with the reflector mechanism 20 properly adjusted, solar radiation, both direct and reflected, will impinge upon the water compartment of the solar collector/heat exchanger unit 16. The solar radiation will be collected by the water compartment and, in the absence of liquid, i.e., pump 78 is not operating, the heat will be transmitted by conduction and radiation into the air compartment of the unit 16 to heat the air being circulated therethrough to and from the interior of the building 11 by means of the blower 38.

During periods of more moderate temperatures when less heating is required, the blower 38 may be turned off and the air flow direction through the solar collector/heat exchanger unit 16 will be reversed. Air will be drawn into the return duct 37 and will move by thermosiphonic action through the air compartment of the unit 16 and will absorb heat conducted and radiated from the water compartment. This heated air will move to the upper end of the unit 16 and will emerge through duct 36 into the building. Such action will create sufficient draft to cause moderate circulation and heating of the air.

For heating of the air at night or during cloudy conditions, hot water from the liquid storage tank 24 is circulated, by means of the pump 78, through the solar collector/heat exchanger unit 16, and air moving from the building through the unit 16 will absorb heat from the water. Such a heating function is preferably accomplished with the retractable cover panel assembly 18 in the closed position to prevent sky radiation and to prevent convection losses of the heat into the relatively cooler atmosphere.

The water 86 within the storage tank 24 may be heated and stored during periods of solar radiation activity, and such is accomplished by circulating the water as described above so that the water will absorb the solar heat impinging upon the water compartment of the solar collector/heat exchanger unit 16. Continuous circulation, or recycling, of the water through the unit 16 during periods of solar activity will gradually heat the water until it reaches a temperature approaching that of the collector surface 44 of the unit 16, at which time the pump 78 may be shut down. When that occurs the water in the system will immediately drain by gravity into the tank 24 for storage until needed.

During the season when cooling is needed, the retractable cover panel assembly 18 is in the closed position and chilled water from the storage tank 24 is circulated through the water compartment of the solar collector/heat exchanger unit 16 to absorb heat from the air being circulated therethrough from the interior of the building 11. When the air is being heated as previously described, air movement through the unit 16 is effected by forcing the air to move downwardly through the unit against the natural tendency for heated air to rise. When the air is being cooled, the draft is increased due to the natural tendency for cold air to fall.

When the liquid 86 is being chilled for use as described above, the liquid is pumped from the storage tank 24 through the supply line 74. With the valve 75 closed and the valve 83 open, the liquid will pass through the evaporator means 22 where chilling thereof will occur due to evaporation. Continued circulation, or recycling, of the liquid through the evaporator means 22 will gradually lower the water temperature to where it is approaching wet bulb temperature which, in the summertime, is about 20° to 40° below the ambient temperature. When that temperature is reached, the pump 78 is shut down and the chilled liquid is stored in the tank 24 for use when needed.

In the cooling season, the evaporator means 22 is preferably employed at night when the ambient temperature and wet bulb temperature are lower which permits the liquid 86 to be chilled to a much lower degree.

Figure 6:
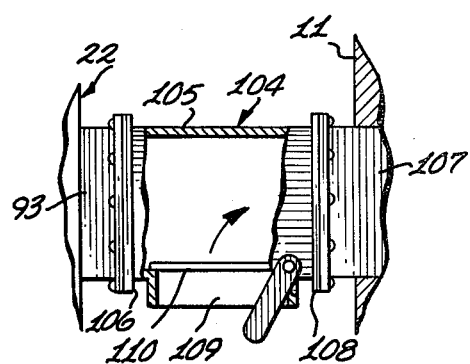
FIG. 6 is a fragmentary view partially broken away to show the various features of the air directing device coupled between the evaporator means and the premises.

When the water is being chilled as described above, air entering and passing through the evaporator means 22, which in the illustrated embodiment is the evaporative cooler 88, will be chilled by evaporation and directed through the centrifugal outlet duct 93 into an air directing device 104 interposed between the evaporator means and the building 11. As seen best in FIG. 6, the device 104 as a T-shaped housing 105 with the centrifugal outlet duct 93 connected to the inlet port 106 thereof and having suitable air delivery duct 107 coupled to the outlet port 108. The air delivery duct 107 communicates from the device 104 into the building 11. The air directing device 104 is also formed with an exhaust port 109 by which the air from the evaporator means 22 may be optionally exhausted to ambient. The selective directing of air is accomplished by a damper 110 pivotably mounted in the housing 105. The chilled air exiting from the evaporator means 22 may be directed into the building 11 as previously mentioned for cooling of the interior thereof. That air will achieve a very comfortable effective temperature particularly in areas having a relatively low humidity. If the air entering the building becomes excessively humid, the damper 110 may be switched to cause the humid air to be exhausted to ambient.

Thus, the evaporator means 22 at night serves a dual purpose; namely, the chilling of the liquid for storage purposes and the simultaneous chilling of air for evaporative or direct cooling of the building. In the daytime when ambient temperatures are high, the evaporator is turned off and the cold water from storage is circulated through the solar collector/heat exchanger unit 16 for indirect cooling of the air as previously described.

At certain times of the year, such as the spring and fall, the outside temperature and relative humidity will be such that no cooling or heating of the air will be needed. In such instances, circulation of fresh outside air may be accomplished by operating the blower 38 which draws air from ambient through the duct 40, through the air directing device 39, through the solar collector/heat exchanger unit 16 and through the duct 37 into the building.

Figure 7:
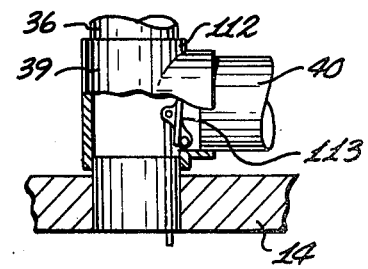
FIG. 7 is a fragmentary view partially broken away to show the various features of the air directing device located in the air inlet duct leading to the solar collector/heat exchanger unit.

As seen in FIG. 7, the air directing device 39 is a T-shaped housing 112 having a suitable damper or flapper valve, 113 mounted therein for movement between positions of closing the inlet port thereto from the interior of the building and of closing the inlet port thereto from the duct 40.

During operation of the above described circulation of fresh air, the air directing device 104 may be employed as an outlet for the fresh air, and/or a window (not shown) may be opened to accomplish or enhance such exhausting of the air. Additionally, the centrifugal blower 91 of the evaporator means 22 may be employed as means for circulating fresh untreated air. Such may be accomplished by not circulating liquid through the evaporator means so as not to achieve any evaporative cooling of the air moving through the evaporator on its way to the building.

In addition to the above described operational capabilities of the solar heating and cooling system 10 of the present invention, considerable cooling of the interior of the building may be accomplished by taking advantage of the phenomenon known as nocturnal radiation. To accomplish this, the retractable cover panel assembly is moved to the open position and air is circulated from the building 11 by means of the blower 38. In this manner heat from the circulating air will be radiated to the night sky, and such radiation may be enhanced by configuring the heat trap 52 of the solar collector/heat exchanger unit 16 so that removal thereof may be accomplished.

While the hereinbefore described solar heating and cooling system 10 constitutes the preferred embodiment, it is contemplated that many installations will be such that installation of this solar collector/heat exchanger unit 16 on the roof 13 will not be practical or possible. In such cases, a wall mounted solar collector/heat exchanger unit 116 (FIG. 8) may be employed. The unit 116 is similar to the previously described unit 16 with minor modifications of the air chamber portion thereof. In the case of the wall mounted solar collector/heat exchanger 116, the air inlet manifold 117 is open along its entire length so that air will freely move into that manifold 117 and will pass upwardly through the air passages 31. That upwardly rising air is collected in the air outlet manifold 118 and directed back into the building 11 by an exhaust duct 120 having a suitable induction draft fan 122 mounted therein.

It will be understood that a system which includes the above described wall mounted solar collector/heat exchanger 116 will include all of the other elements and components hereinbefore described with relation to the system 10 such as the rectractable cover panel assembly 18, solar reflector 20, evaporator means 22, storage tank 24, and so forth. The operation of the system employing the wall mounted solar collector/heat exchanger unit 116 will be the same as that previously described for the system 10. In addition to the previously noted operations, in the wall mounted solar collector/heat exchanger the inwardly disposed wall 124 of the air compartment will act as a radiating surface when heating operations are being accomplished and will act as a heat absorbing surface when cooling functions are being accomplished. Other operational advantages of the wall mounted system such as the so-called chimney effect where air movement through the solar collector/heat exchanger unit 116 due to thermo-siphoning will cause the air to move more rapidly than in the angularly disposed roof mounted unit 16. Additionally, the wall mounted unit 116 is more readily accessible for maintenance purposes and no air moving ducts are required.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles.

For example, it will be apparent that the various functions of the system, such as switching from a heating mode to a cooling mode may be accomplished manually as shown and described, however, existing mechanisms for sensing, switching and otherwise may be readily adapted to the system. Such devices may include humidistats, thermostats, solar radiation sensing devices, solenoid switching valves and the like.

The appended claims are therefore intended to cover and embrace any such modifications within the limits only of the true spirit and scope of the invention.

What I claim is:

1. A solar heating and cooling system comprising:
   (a) a solar collector/heat exchanger unit including,
      I. an enclosure having a solar window heat trap therein and disposed with a vertical component to provide upper and lower ends,
      II. an air compartment in said enclosure and having air inlet and outlet ducts extending therefrom,
      III. duct means having a blower therein for connecting the air inlet and outlet ducts of said air compartment with a point of use for circulating air through said air compartment,
      IV. a liquid compartment in said enclosure above said air compartment and having liquid inlet and outlet pipelines, said liquid compartment and said air compartment coextensive and in contiguous engagement with each other for transferring thermal energy therebetween;
   (b) a retractable cover panel assembly adjacent said solar collector/heat exchanger unit and movable between positions of covering and uncovering said solar collector/heat exchanger unit;
   (c) evaporator means having liquid inlet and outlet pipelines and having an air inlet and an air outlet, said evaporator means operable to chill air and liquid by evaporation;
   (d) air directing means coupled between the air outlet of said evaporator means and a point of use for selective directing of chilled air to the point of use or to ambient;
   (e) a liquid storage tank below said solar collector/heat exchanger unit and said evaporator means, said liquid storage tank having the liquid outlet pipeline of said evaporator means coupled thereto and having the liquid outlet pipeline from said liquid compartment of said solar collector/heat exchanger unit coupled thereto; and
   (f) a liquid supply line connected on one end thereof to said liquid storage tank with the other end connected to both the liquid inlet pipeline of said evaporator means and the liquid inlet pipeline of said liquid compartment of said solar collector/heat exchanger unit, said liquid supply line having a pump and shutoff valves therein by which the liquid in said storage tank is switchably supplied to said evaporator means or to said liquid compartment of said solar collector/heat exchanger unit.

2. A solar heating and cooling system as claimed in claim 1 and further comprising a solar radiation reflector mechanism adjacent said solar collector/heat exchanger unit and adjustably movable for reflecting solar radiation into said solar collector/heat exchanger unit.

3. A solar heating and cooling system as claimed in claim 1 wherein:
   (a) said enclosure of said solar collector/heat exchanger unit is of substantially flat rectangular configuration with a planar bottom surface and having normally extending side walls which define an opening in said enclosure; and
   (b) said solar window heat trap of said enclosure includes a frame for supporting at least one transparent sheet, said frame demountably attached in the opening of said enclosure.

4. A solar heating and cooling system as claimed in claim 1 wherein said air compartment of said solar collector/heat exchanger unit comprises:
   (a) a plurality of channel members in parallel coextending relationship and arranged to define a plurality of air passages therethrough;
   (b) an air inlet manifold transversely affixed to said plurality of channel members at one end thereof and in sealed communication with all of the air passages defined thereby, said air inlet manifold having said air inlet duct affixed thereto; and
   (c) an air outlet manifold transversely affixed to the opposite end of said plurality of channel members and in sealed communication with all of the air passages defined thereby, said air outlet manifold having said air outlet duct affixed thereto.

5. A solar heating and cooling system as claimed in claim 1 wherein said liquid compartment of said solar collector/heat exchanger unit comprises:
   (a) a pair of coextending spaced metallic sheets sealed on the opposite side edges thereof and open along the length of each of the opposite end edges, at least one of said sheets treated with a coloring agent for darkening at least the surface thereof which faces the solar window heat trap of said solar collector/heat exchanger unit;

(b) a liquid feed pipe sealingly affixed to one of the open end edges of said pair of metallic sheets along the length of that opening, said feed pipe being perforated and having the liquid inlet pipeline of said solar collector/heat exchanger unit in communication therewith so that when liquid is supplied under pressure from said storage tank, that liquid will be emitted from said feed pipe to form a film to liquid between said pair of metallic sheets; and (c) a liquid trough sealingly affixed to the opposite open end edge of said pair of metallic sheets along the length of that opening, said liquid trough having the liquid outlet line of said solar collector/heat exchanger unit in communication therewith, said liquid trough for collecting liquid emerging from between said pair of metallic sheets when liquid is supplied thereinto from said liquid feed pipe.

6. A solar heating and cooling system as claimed in claim 1 wherein said air directing means comprises:
   (a) a T-shaped housing having an inlet port and a pair of outlet ports; and
   (b) a damper pivotably mounted in said T-shaped housing for movement between said pair of outlet ports for selective opening and closing thereof.

7. A solar heating and cooling system as claimed in claim 1 wherein said duct means further includes means for optionally supplying fresh ambient air for circulation through said air compartment of said solar collector/heat exchanger unit.

8. A solar heating and cooling system as claimed in claim 1 wherein said duct means comprises:
   (a) a return air duct connected to the air outlet duct of said air compartment for directing air exiting therefrom to the point of use;
   (b) a supply duct connected to the air inlet duct extending from said air compartment for supplying air from the point of use thereto, said supply duct having said blower therein;
   (c) a T-shaped housing in said supply duct upstream of said blower, said housing having an outlet port connected to said blower and a first inlet port for communication with the point of use and a second inlet port;
   (d) a fresh air duct connected to the second inlet port of said T-shaped housing; and
   (e) a damper pivotably mounted in said T-shaped housing for movement between said first and second inlet ports for selective opening and closing thereof.

9. A solar heating and cooling system as claimed in claim 1 and further comprising:
   a) a heat exchanger coil in said liquid storage tank; and
   b) at least one auxiliary heating device coupled to said heat exchanger coil and operable to heat the liquid in said storage tank.

10. A solar heating and cooling system as claimed in claim 1 and further comprising:
    a) a heat exchanger coil in said liquid storage tank; and
    b) at least one auxiliary cooling device coupled to said heat exchanger coil and operable to chill the liquid in said storage tank.

11. A solar heating and cooling system as claimed in claim 1 wherein said retractable cover panel assembly comprises:
    (a) a panel of thermally insulative material configured to have a surface area which conforms and is approximately equal to the surface area of the solar window heat trap of said solar collector/heat exchanger unit, said panel slidably movable relative to said solar collector/heat exchanger unit for covering and uncovering thereof; and
    (b) means coupled to said panel for slidingly moving said panel.

12. A solar heating and cooling system as claimed in claim 11 wherein said means for slidingly moving said panel comprises:
    (a) a pair of elongated bars each affixed to a different opposite end of said panel, each of said bars carried in a plurality of spacedly arranged roller wheels;
    (b) each of said bars provided with an extending end on which a rack is formed;
    (c) a rotatable drive shaft extending between the racks formed on said pair of bars and having a pinion gear on each end of said shaft for engaging the racks of said bars; and
    (d) a reversible motor coupled to said drive shaft for rotatable driving thereof.

* * * * *